(12) United States Patent
Hosking et al.

(10) Patent No.: US 7,008,838 B1
(45) Date of Patent: Mar. 7, 2006

(54) CONFIGURING A CAPACITOR WITH ENHANCED PULSE RELIABILITY

(75) Inventors: Terry Hosking, Barre, VT (US); Kenneth Kennedy, Washington, VT (US)

(73) Assignee: SBE, Inc., Barre, VT (US)

( * ) Notice: Subject to any disclaimer, the term of this patent is extended or adjusted under 35 U.S.C. 154(b) by 0 days.

(21) Appl. No.: 10/834,628

(22) Filed: Apr. 28, 2004

Related U.S. Application Data

(60) Provisional application No. 60/466,654, filed on Apr. 29, 2003.

(51) Int. Cl.
*H01L 21/8242* (2006.01)
(52) U.S. Cl. .................. 438/239; 361/305; 361/303
(58) Field of Classification Search .................. None
See application file for complete search history.

(56) References Cited

U.S. PATENT DOCUMENTS 5,610,796 A * 3/1997 Lavene .................. 361/303

5,696,663 A   12/1997 Unami et al.

* cited by examiner

*Primary Examiner*—Thao P. Le
(74) *Attorney, Agent, or Firm*—Michael Pritzkau

(57) ABSTRACT

A modified capacitor for replacing an unmodified capacitor includes two unmodified metallized strips, each supported by an unmodified dielectric film arrangement that is made up of two dielectric films. Each unmodified metallized strip has an elongated length and includes an unmodified active region and a lengthwise unmodified, heavy-edge region. The two dielectric films are wound together to form a roll having opposing ends such that the lengthwise unmodified, heavy-edge region of each unmodified metallized strip cooperate in forming the opposing ends for external electrical connection thereto. The unmodified capacitor exhibits a given value of pulse current tolerance. The modified capacitor includes first and second modified metallized strips, each including a modified active region electrically cooperating with a modified, heavy-edge region, to produce a modified value of pulse current tolerance in the modified capacitor that is greater than the given value of pulse current tolerance in an unmodified capacitor.

6 Claims, 16 Drawing Sheets

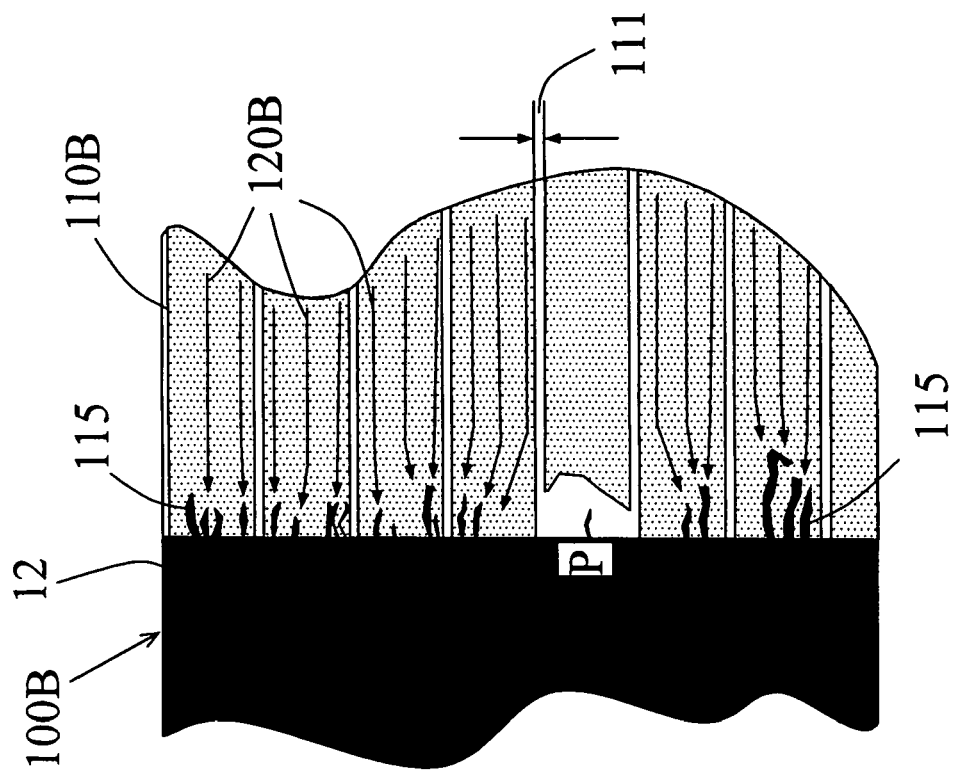
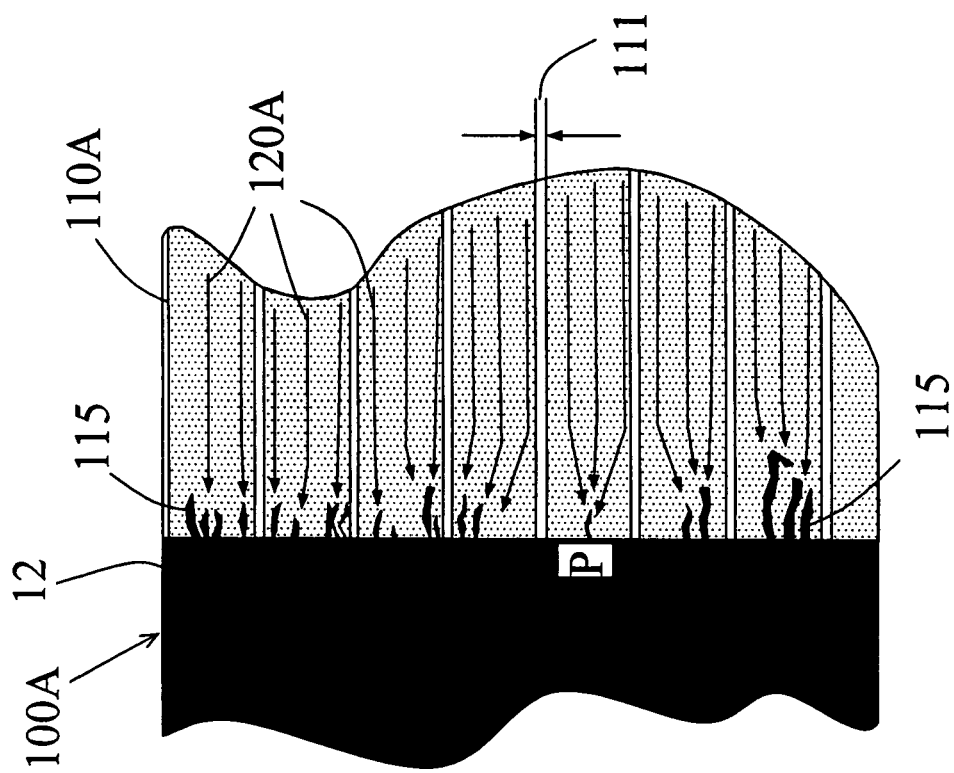
FIG. 2A (Prior Art)
FIG. 2B (Prior Art)

CONFIGURING A CAPACITOR WITH ENHANCED PULSE RELIABILITY

CROSS-REFERENCE TO RELATED APPLICATIONS

This application claims the benefit of U.S. Provisional Patent Application No. 60/466,654 filed Apr. 29, 2003, the contents of which are hereby incorporated by reference.

BACKGROUND OF THE INVENTION

The present invention relates generally to capacitors and, more particularly to metallized film capacitors especially suited for use in pulse applications.

The use of metallized electrodes evaporated onto capacitor dielectric film is an advantageous way to achieve small film capacitor size for a given capacitance and voltage. Although many configurations are possible using metallized film, a configuration which uses two dielectric films and two metallized electrode layers is generally regarded as an optimum design for a given size, capacitance and voltage withstand ratings. For example, two oblong dielectric films are each coated with a metallized electrode layer. The dielectric films may include a longitudinal direction and a transverse direction such that the dimension of the dielectric films in the longitudinal direction is longer than that in the transverse direction. The two dielectric films are disposed in an overlapping fashion such that the metallized electrode layers of the two dielectric films are not in contact. Then, the overlapping films are wound together to form a roll including alternating, offset layers of the metallized film. The roll then becomes the main body of the capacitor.

The connection to the metallized electrodes is generally made by spraying molten metal droplets at the ends of capacitors wound with alternating offset layers of the metallized film. Unfortunately, this connection is not usually homogenous nor continuous. The first droplets to hit the edge of the capacitor film splatter onto the extension volume where they solidify and come into contact with the metallized film. These splattered metal droplets serve as the electrical and mechanical connection to the metallized film. The ends of the capacitor are built up with sprayed metal until there is sufficient thickness for attaching lead wires thereon. Since the capacitor current is carried entirely through the splattered droplets, the current density in the metallization adjacent to those connection points is very high. When current density becomes too intense around a particular connection point, the metallization layer surrounding the connection point tends to become at least partially vaporized, thereby destroying the connection point.

The AC power industry uses very large capacitors for power factor correction. These large capacitors store a large amount of energy, and, if a dielectric fault occurs, a large amount of internal capacitor damage is possible if the current is not limited. The use of capacitors (minimally sized using the above described, traditional construction) in pulse applications has been limited by the capability of the connection points to carry current between the metallization and the end spray metal without vaporizing the metallization layer around these contact points due to the high current density. The problem is not so much that some of the connections disappear, but that, as each connection point is removed, the current in the adjacent connection points increases. This increase in current at adjacent connection points tends to initiate a runaway failure mode, in which each subsequent discharge removes a substantial number of the connection points. As these connection points are lost along a substantial length of the film, the capacitance quickly becomes extremely lossy because current is forced to flow along the length of the metallization layer to the nearest contact location. This current flow along the length of the metallization will degrade the quality of the capacitance. The damaged capacitor cannot be discharged as quickly, and the available discharge current consequently drops rapidly, thus leading to catastrophic failure of the entire capacitor. As a result, applications that depend on very fast discharge at high current can fail quickly and without warning within a very few discharges.

Turning now to the drawings, wherein like components are indicated by like reference numbers throughout the various figures where possible, attention is immediately directed to FIGS. 1A–1D, which illustrate the mechanism of runaway failure due to vaporization of the metallization layer around the connection points. It is noted that the various components shown in the figures are not shown to scale for purposes of illustrative clarity. FIG. 1A presents a magnified view of a capacitor 1A including an interface between a metallized film 10 and an end spray metal 12. A plurality of connection points are indicated by marks 15. A plurality of arrows 20A indicates current flow direction upon application of a first discharge pulse. Attention is particularly directed to one of the plurality of connection points 15 indicated by a letter P. This small connection point P is a weak link between metallized film 10 and end spray metal 12, as will be described in detail immediately hereinafter.

As shown in FIG. 1B, the application of the first discharge pulse results in vaporization of the metallization immediately surrounding connection point P, thereby resulting in a connection failure 30 around connection point P. Current flow direction (indicated by arrows 20B) thereby shifts to skirt around connection failure 30 upon application of a second pulse discharge. In particular, the density of current flow (indicated by the concentration of arrows 20B) around connection failure 30 increases, consequently causing further damage to the metallization surrounding connection failure 30.

FIG. 1C illustrates such increasing damage to the metallization layer surrounding connection point P. Particularly, connection failure 30 of FIG. 1B has expanded in area into an increased, connection failure 30'. Current flow direction (indicated by arrows 20C) in the presence of a third pulse discharge now skirts around increased connection failure 30' such that the density of current flow (indicated by the concentration of arrows 20C) is further increased around connection failure 30'. The increased density of current flow around connection failure 30' leads to further damage to the metallization such that the connection failure still increases in size (as indicated by reference numeral 30" in FIG. 1D) with successive pulse discharge. It is noted that the amount of damage to the metallization layer due to this effect is dependent upon the size of pulse current. With large pulse currents, each occurrence of pulse discharge may lead to vaporization of a significant length of metallization, thereby quickly leading to substantially complete disconnection of metallization layer 10 from end spray metal 12 and, consequently, to capacitor failure.

One way to improve the performance of traditional design capacitor films in pulse application is to make the capacitors short, with the diameter being equal to or larger than the length of the rolled capacitor film. In this way, the short capacitor would include a long edge onto which the end spray metal may come into contact such that, for a given pulse current, the current carried per unit length of film is smaller in the short capacitor than in the traditional capacitor. Consequently, the current carried through each connection point between the end spray metal to the metallization is reduced. For a given capacitance and film thickness, the current carried per unit film length increases as the form factor of the capacitor is varied toward longer length and smaller diameter. However, the limited availability of space in many applications generally make longer capacitors more desirable as they make better use of available volume.

In general, the capacitor manufacturing process must be very well controlled because, if at some location the contact of the end spray metal to the metallization layer is inadequate to carry its share of the discharge current, that location becomes the initiation point for catastrophic capacitor failure as described above. This problem may be alleviated by making the edge of the metallization, which serves as the end onto which the end spray metal makes contact, thicker than the metallization of the remaining active part of the capacitor. This so-called "heavy-edge" metallization is a major improvement over the traditional capacitor design because it significantly increases the allowable current density before failures occur. However, the heavy-edge in itself does not change the mechanism of capacitor runaway failure. As a result, the pulse current capability of the capacitor with a heavy-edge metallization remains dependent on the manufacturing process. In other words, heavy-edge metallization has been used to allow end spray metal to better connect to the metallized film edge when thinner metallization is used in the active area to optimize capacitor voltage withstand.

In prior art capacitors, the heavy-edge is created by depositing more metal (such as aluminum) at the film edge in comparison to the active region of the capacitor, or by separately depositing a second metal (such as zinc) only at the film edge so as to result in the heavy-edge that will safely carry higher current therethrough in comparison to a capacitor without the heavy-edge structure. Metallization thickness is commonly quantified by the surface resistivity in units of ohms/square. It is known that there is a large difference in resistivity between different materials, such as between aluminum and zinc. A zinc layer of a certain resistivity value would be several times thicker than a layer of aluminum of equivalent resistivity. Therefore, one may achieve a thicker heavy-edge by separately depositing, for example, a zinc layer along the edge of a very thin, aluminum layer active region (as taught by Unami et al. in U.S. Pat. No. 5,696,663 (hereinafter Unami)). Alternatively, (different from Unami's teachings) the active region and the heavy-edge may be formed of a single alloy, but this technique is substantially limited in the current art because it is believed that one cannot simultaneously achieve a thin enough active region for self-healing and a thick enough heavy-edge for improved contact with the end spray metal by using a single alloy. As another alternative, it is recognized that making two passes with aluminum may also be used to build up the heavy-edge but allowing a large heavy edge to body ratio after the second pass. However, this approach does not mitigate the problems inherent in pulse applications because the resulting aluminum heavy-edge is too thin and therefore does not lead to sufficiently decreased current density. The present state of the art zinc alloy heavy-edge has a ratio limit between the metallization thickness in the active area and the metallization thickness along the heavy-edge. It is submitted that this limit in thickness ratio prevents simultaneous optimization of pulse current capability and voltage withstand. The exact details of the heavy-edge fabrication is known in the art and is considered to be outside the scope of this application.

Another variation in film capacitor design is segmenting of the metallization layer in specific ways. Segmentation was initially conceived as a method to allow disconnection of a defective segment, such as a segment including a dielectric fault, from the end spray metal. The segmentation prevents current within the film capacitor from traveling along the length of the film toward the fault site. The segmentation also forces the fault current to flow through the connection from the end spray metal to the defective segment. However, the ability of conventional segmentation schemes to control fault current via the end spray metal to metallization is poor due to the close dependence of the connection quality to the manufacturing process variability. More elaborate segmentation patterns which use narrow "bottleneck" configurations to limit current have also been devised. For instance, if too high a current flowed through one of these bottleneck segments, the metallization in the bottleneck would vaporize and essentially act as a fuse, thus preventing internal current from reaching the fault location. The use of such segmentation schemes are advantageous because the thickness and patterning of the metallization layer is much more easily controlled than the connection of the end spray metal to the metallization layer.

The effect of segmentation metallization on reducing runaway capacitor failure is illustrated in FIGS. 2A and 2B. Like capacitor 1A–1D of FIGS. 1A–1D, a capacitor 100A of FIG. 2A includes end spray metal 12. However, capacitor 100A also includes a segmented metallization film 110A, with each segment being spaced apart from every other segment by a separation 111. A plurality of marks 115 indicate a plurality of connection points. Direction of current flow upon application of a first pulse discharge is indicated by a plurality of arrows 120A. In particular, a high current density (indicated by the concentration of current flow 120A) around a small connection point P leads to vaporization of the metallization around connection point P, as shown in FIG. 2B. However, due to the plurality of separation 111, the connection failure is isolated to that segment containing connection point P, and application of additional pulse discharge does not necessarily result in further damage to segment metallization film 110B. Therefore, connection failure around connection point P does not propagate beyond that segment containing connection point P even with application of additional pulse current.

An example of metallization segmentation is presented by aforementioned Unami, which describes the patterning of the metallization layer in the longitudinal direction such that the electrode metallization is in the form of long strips in the longitudinal direction on the dielectric films. By offsetting the pattern on the two films forming the capacitor main body, the capacitor of Unami effectively acts as a plurality of sub-capacitors placed in series (see, for example, FIGS. 4A–4D of Unami). Unami also suggests segmenting the metallization layer in the transverse direction as well as the longitudinal direction such that the capacitor is composed of a plurality of sub-capacitors placed in parallel as well as in series (see, for example, FIG. 5 of Unami). It is submitted that the segmentation is used solely to help isolate dielectric faults in capacitors designed to best use the film dielectric strength (i.e., to achieve the highest possible voltage rating for a given film thickness). In both cases of segmentation patterns as discussed in Unami, the metallization also includes a heavy-edge formed by separately depositing a zinc edge film on top of an aluminum film forming the active region. That is, Unami discloses the use of an aluminum layer as the active region of the metallization and a separately deposited, zinc film forming the heavy-edge in order to make the active region thin enough for self-healing (i.e., vaporization of the metallization film around an insulation defect) to take place while the heavy-edge is made thick enough for improved contact with the end spray metal. In particular, Unami requires that the aluminum, active region exhibit a resistivity of 8 ohms per square or greater, while the heavy-edge be configured to exhibit a resistivity of 1.5 to 7 ohms per square (see, for example, column 7 line 59 to column 8 line 23 of Unami), with the lower resistivity of 1.5 ohms or 2 ohms per square not being materially important to the Unami design. Unami explains that this two-step metallization process, using two different metals, is necessary because it is difficult to attain the aforedescribed combination of thickness/thinness properties using the same material for the heavy-edge and the active region (see, for example, column 2 line 66 to column 3 line 6 of Unami). Unami is basically concerned with increasing the voltage withstand of the capacitor, rather than to optimize pulse current for pulse operation. In fact, the resistivity recommendations of Unami, as justified in FIG. 16 of Unami, show that if the heavy-edge is made too thick (i.e., thicker than a thickness yielding 2 ohms/square), the capacitor voltage withstand capability may be compromised.

The present invention provides a capacitor and associated method which serves to reduce or eliminate the foregoing problems in a highly advantageous and heretofore unseen way and which provides still further advantages.

SUMMARY OF THE INVENTION

As will be discussed in more detail hereinafter, there is disclosed herein a modified capacitor configured to replace an unmodified capacitor including two unmodified metallized strips supported by an unmodified dielectric film arrangement that is made up of two dielectric films. Each one of the unmodified metallized strips has an elongated length and includes an unmodified active region and a lengthwise unmodified, heavy-edge region. The two dielectric films are wound together to form a roll having a pair of opposing ends such that the lengthwise unmodified, heavy-edge region of each one of the unmodified metallized strips cooperate in forming the opposing ends for external electrical connection thereto. The unmodified capacitor includes a pulse current degradation characteristic which causes the unmodified capacitor to exhibit a given value of pulse current tolerance. The modified capacitor includes first and second modified metallized strips, each including a modified active region electrically cooperating with a modified, heavy-edge region, to produce a modified value of pulse current tolerance in the modified capacitor that is greater than the given value of pulse current tolerance.

In another aspect of the invention, there is disclosed a capacitor configured for pulse current tolerance. The capacitor includes first and second metallized film arrangements including first and second dielectric films, with first and second metallization layers, respectively, formed thereon. The first and second metallized films are wound together to form a main body of the capacitor, at least one of the first and second metallization layers including an active region that is electrically connected with a heavy-edge region. The active region includes an active region resistivity of less than 8 ohms/square while the heavy-edge configuration includes a heavy-edge resistivity of less than 1.5 ohms/square.

In still another aspect of the invention, there is disclosed a capacitor configured for pulse current tolerance. The capacitor of the present invention includes a first metallized film arrangement including a first dielectric film with a common layer, deposited thereon. The common layer is configured as a continuous layer of electrically conductive material. The capacitor also includes a second metallized film arrangement including a second dielectric film having a pair of longitudinal edges running generally parallel in a longitudinal direction. The second metallized film arrangement further includes first and second metallization strips, each of which is deposited inwardly extending from one of the longitudinal edges of the second dielectric film. Each one of the first and second metallization strips includes an active region and a heavy-edge region. The heavy-edge region has a greater thickness than the active region and is disposed at least generally along one of the longitudinal edges such that, when the first and second metallized films are wound together to form a roll, the heavy-edge region of the first and second metallization strips and the transverse edges define opposing ends of the roll, across which a pulse current may be applied. The first and second metallization strips define a plurality of spaced-apart gaps in a direction that is at least generally transverse to the longitudinal direction such that the first and second metallization strips are divided into a plurality of current-isolated segments along the longitudinal direction.

In yet another aspect of the invention, there is disclosed a method for using a capacitor including first and second dielectric elongated layers with first and second metallization arrangements, respectively, supported by the layers. Each one of the first and second dielectric films includes a pair of opposing edges running generally parallel in an elongated direction. Each of the first and second metallization arrangements includes an active region and a lengthwise, heavy-edge region in electrical communication with the active region arranged generally along one of the opposing edges of one of the dielectric films such that a boundary, formed between the active region and the heavy edge region of each metallization arrangement, can be subject to runaway disconnection of the heavy edge region from the active region, along the boundary, responsive at least to using the capacitor to externally deliver one or more current pulses through a pair of external electrical connections. The first and second dielectric films are wound together into a roll to form a main body of the capacitor, the heavy edge region of each of the first and second metallization arrangements being configured to form the pair of external electrical connections at opposing ends of the roll, the method comprising segmenting at least a selected one of the first and second metallization arrangements to form a plurality of current-isolated segments that are arranged along the elongated direction in a way which confines an initial disconnection formed within the boundary of a particular one of the segments to that particular segment responsive to the one or more current pulses such that only the particular segment is subject to runaway.

In a further aspect of the invention, there is disclosed a method for using a capacitor. The capacitor includes first and second dielectric elongated layers with first and second metallization arrangements, respectively, supported by at least one of the layers. Each one of the first and second dielectric films has a pair of opposing first and second dielectric edges running generally parallel in an elongated direction. Each of the first and second metallization arrangements includes an active region defining a first lengthwise edge thereof and a heavy-edge region in electrical communication with the active region and defining a second lengthwise edge thereof such that a corona discharge occurs along the second lengthwise edge responsive to a given current.

The first and second dielectric films are wound together into a roll to form a main body of the capacitor so that the heavy-edge regions of the first and second metallization arrangements form a pair of external electrical connections at opposing ends of the roll, the method includes configuring the first and second metallization layers in a way which moves the corona discharge away from the second lengthwise edge thereof.

BRIEF DESCRIPTION OF THE DRAWINGS

The present invention may be understood by reference to the following detailed description taken in conjunction with the drawings briefly described below.

FIGS. 2A and 2B are a series of diagrammatic illustrations, in partial cross section, of the metallization to end spray metal interface of a conventional film capacitor, shown here to illustrate a possible effect of a large pulse current in the presence of segmentation in the metallization.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles herein may be applied to other embodiments. Thus, the present invention is not intended to be limited to the embodiment shown but is to be accorded the widest scope consistent with the principles and features described herein.

This application describes design concepts that result in metallized capacitors that have the following capabilities not known by Applicants to be available in the marketplace as of June, 2002:

1. The capacitor manufactured in accordance with the present invention can withstand extreme and repetitive discharges (including minimal inductance short circuits at full rated voltage for some configurations) with minimal degradation.

2. The capacitor design of the present invention allows a much longer/thinner form factor for capacitors to be used in pulse applications than is obtainable with traditional designs.

3. The capacitor design of the present invention enables much smaller capacitors to exceed the pulse current capability of traditional, larger designs.

4. Extreme stress testing indicates that a capacitor fabricated in accordance with the present invention demonstrates greater tolerance to corona damage, thus yielding longer capacitor life in extreme discharge applications.

5. Traditionally, pulse current capability of capacitors of conventional design is extremely manufacturing process sensitive. In contrast with conventional capacitor designs, the pulse current capability of the capacitor of the present invention is substantially uncoupled from possible manufacturing process variations.

6. The capacitor design of the present invention enables a more "graceful" handling of environmental abuse, such as electrical, thermal, humidity and/or physical damage—that is, the degradation of the capacitor of the present invention is predictable.

7. If degradation does occur in the capacitor of the present invention,
   a. the degradation will not result in catastrophic or "runaway failure" of the capacitor,
   b. the degradation will essentially be limited to capacitance loss, and
   c. the capacitance remaining after extreme environmental abuse is still of very good quality during pulse discharge.

Figure 1B:
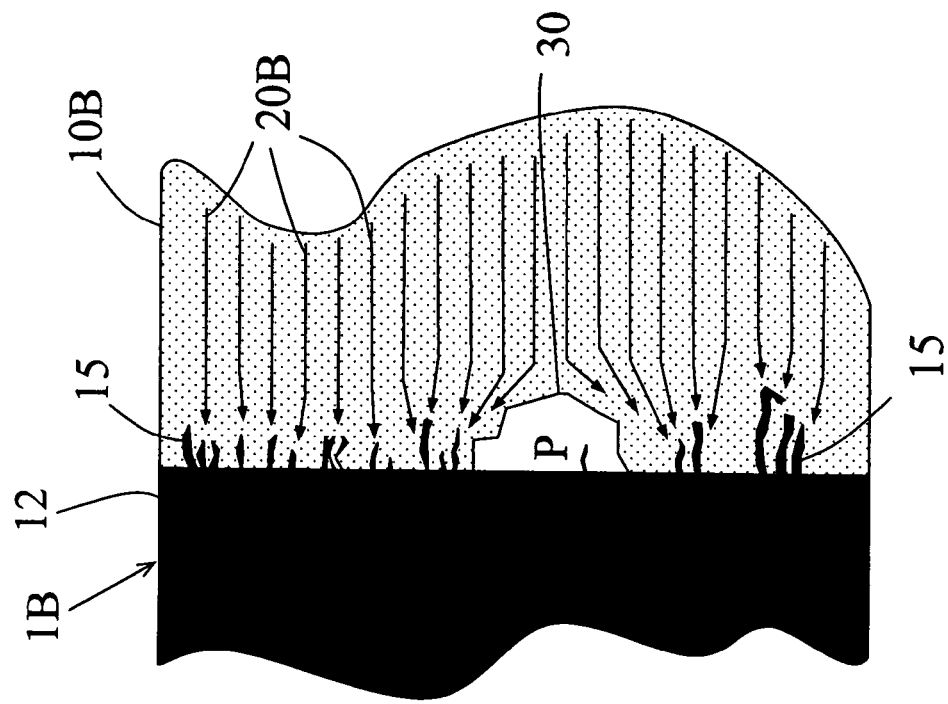
FIGS. 1A–1D are a series of diagrammatic illustrations, in partial cross section, of the metallization to end spray metal interface of a conventional film capacitor, shown here to illustrate a possible sequence of events resulting in pulse current failure.
Figure 1A:
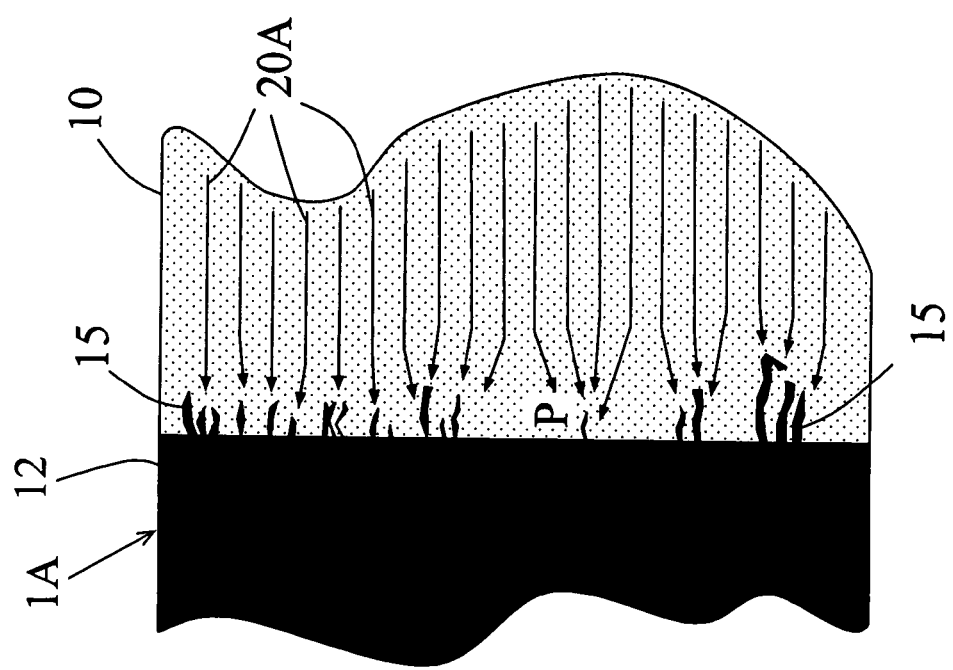
Figure 1C:
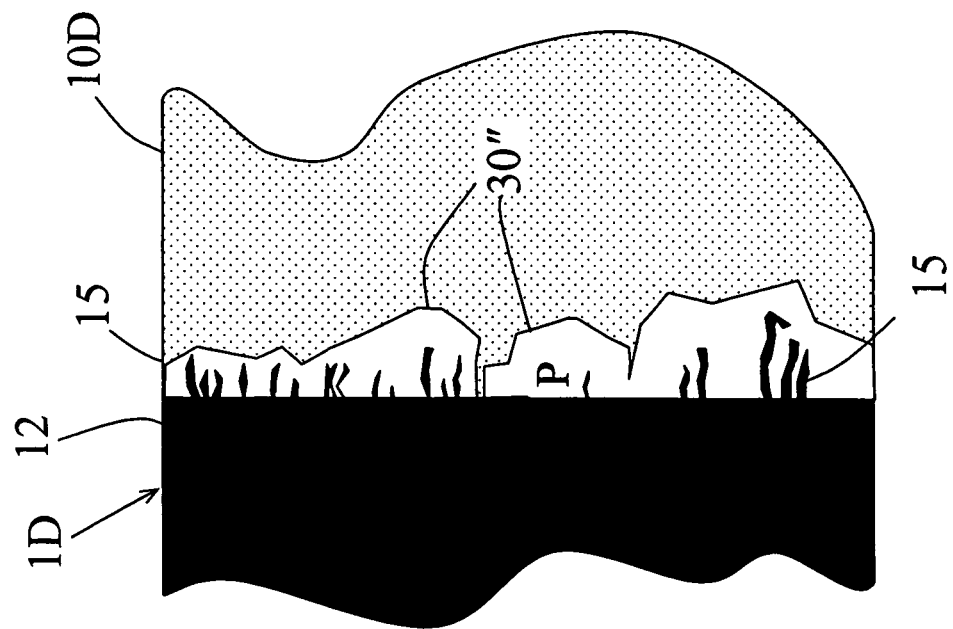
Figure 1D:
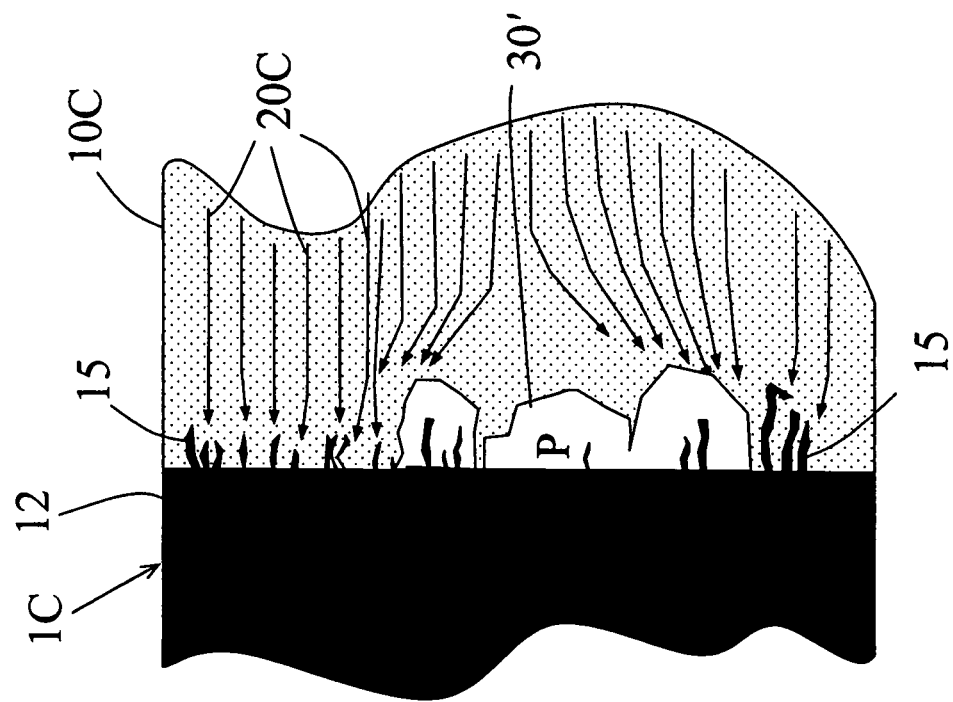
Figure 3A:
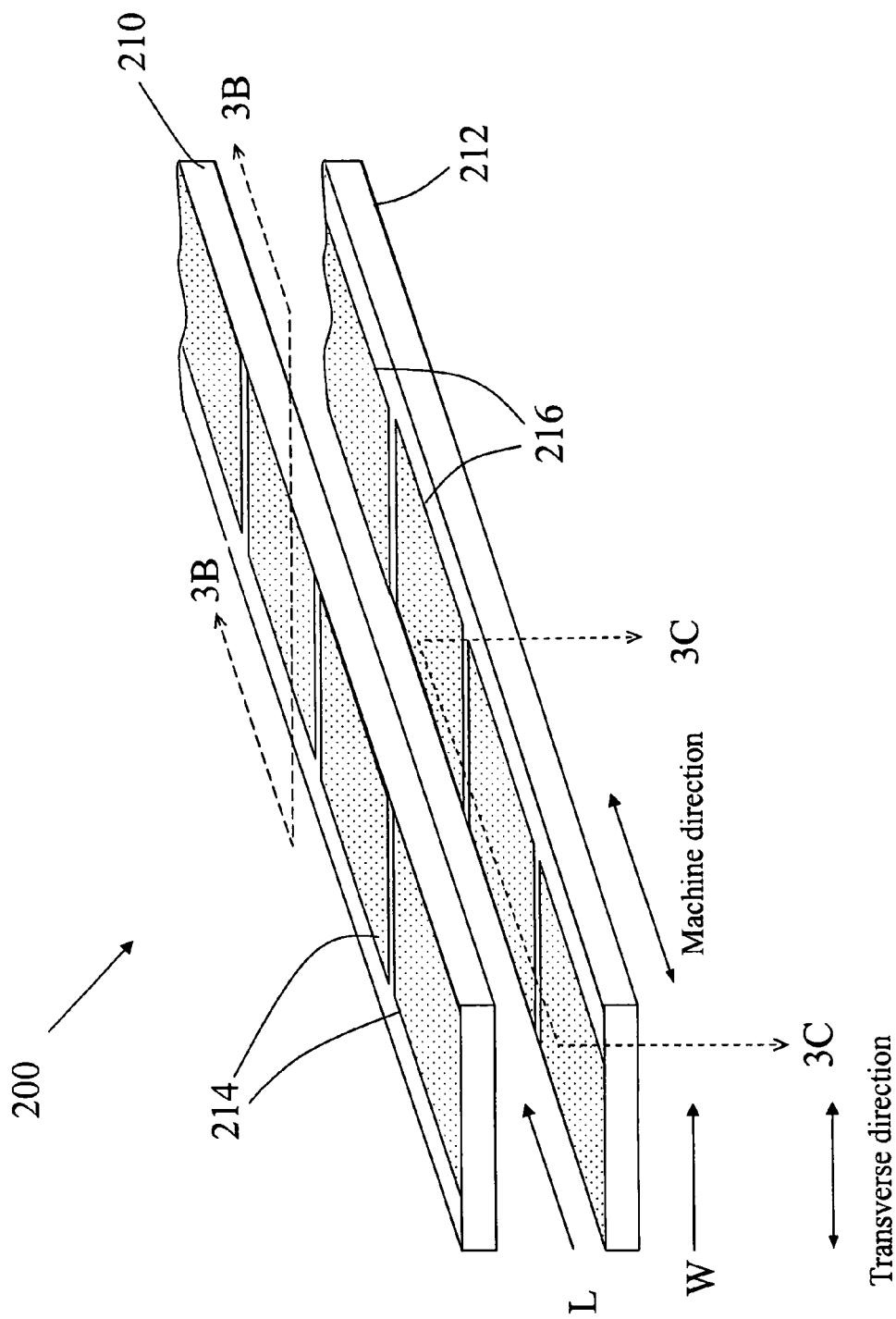
FIG. 3A is a diagrammatic illustration, in perspective view, of a capacitor of the present invention, shown here unwound to illustrate the segmentation configuration.
Figure 3B:
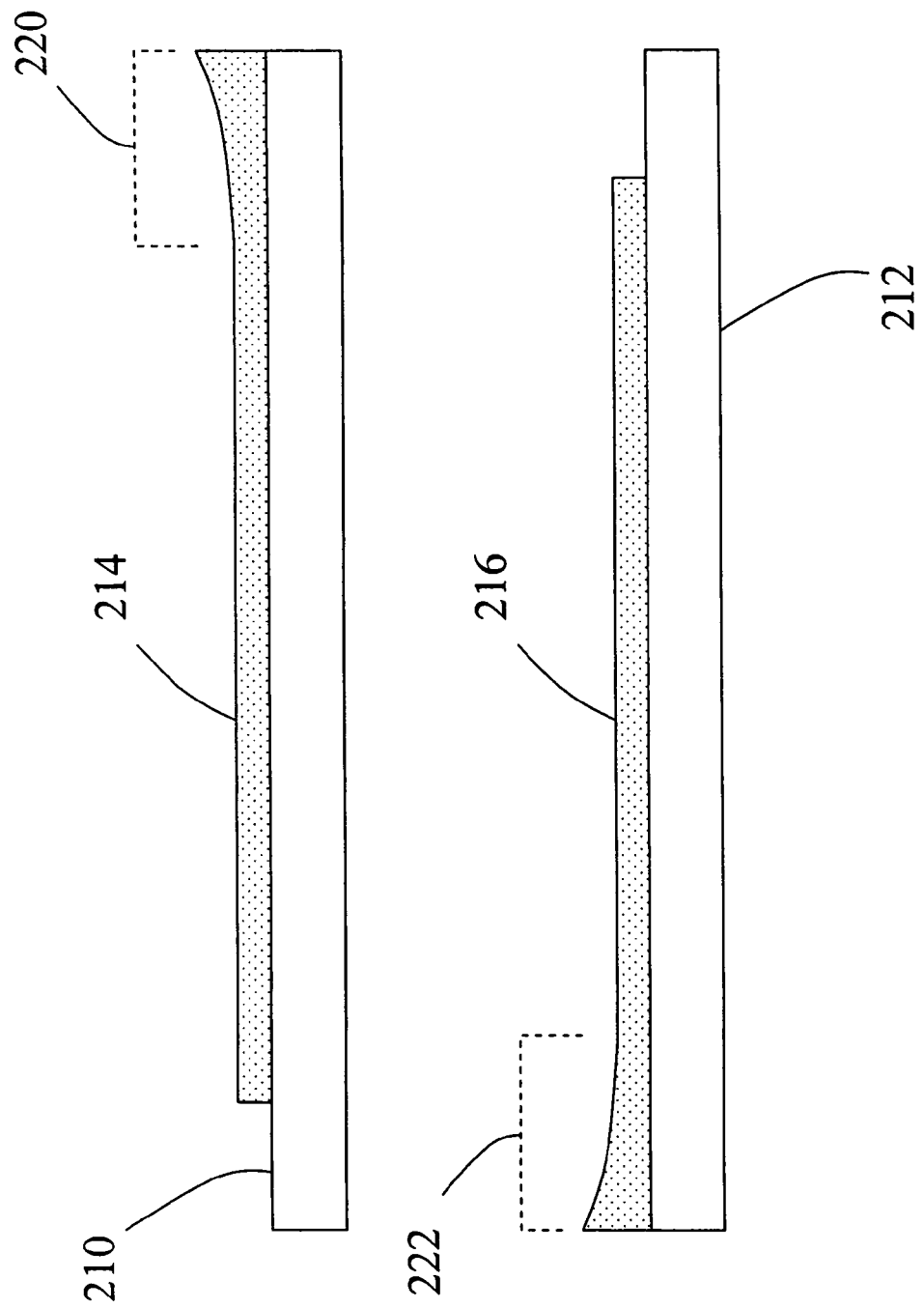
FIG. 3B is a diagrammatic illustration of a cross-sectional view of the unwound capacitor of FIG. 3A, shown here to illustrate the details of the heavy edge configuration.
Figure 3C:
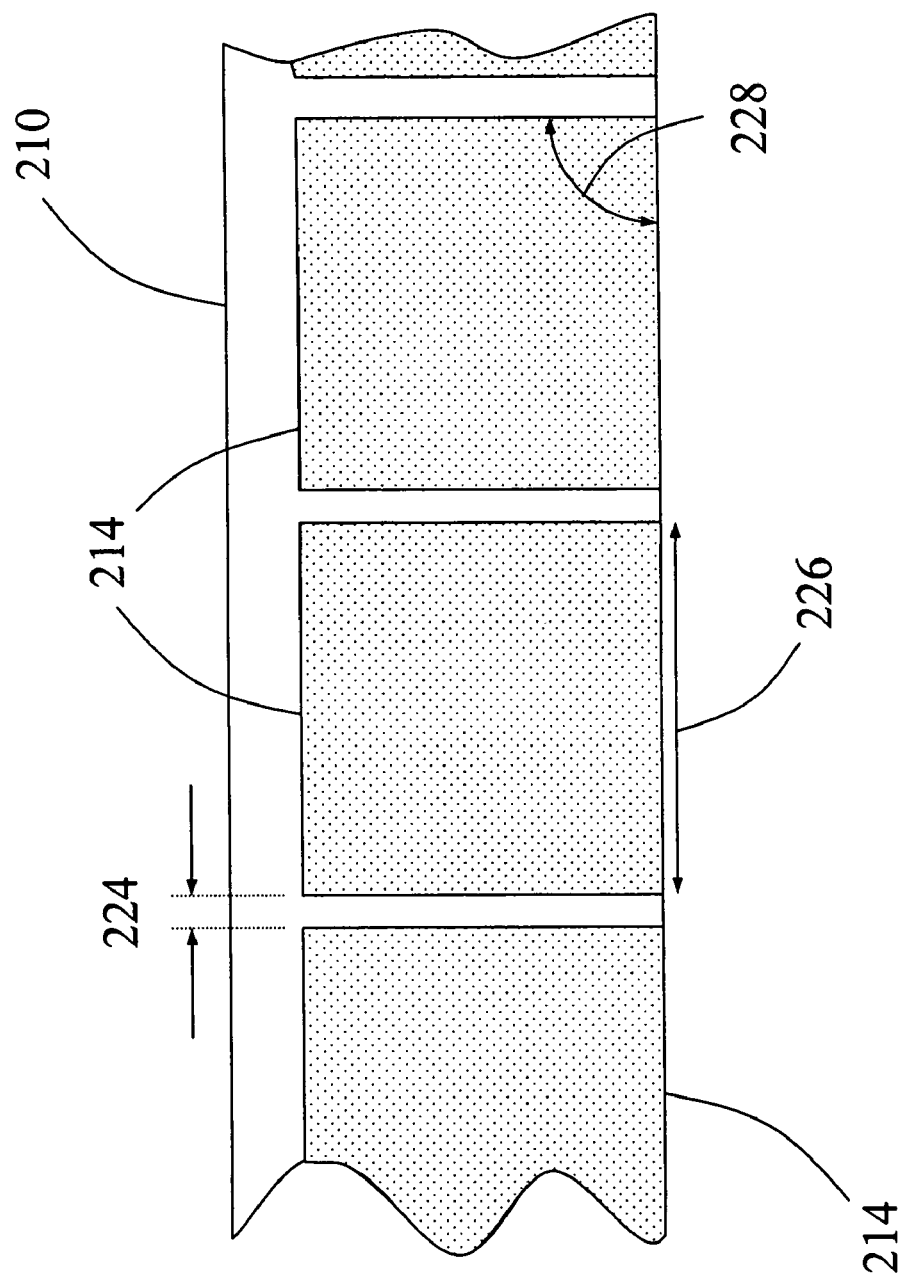
FIG. 3C is a diagrammatic illustration of a top view of the unwound capacitor of FIG. 3A, shown here to illustrate further details of the segmentation configuration.

Turning now to FIGS. 3A–3C, a capacitor fabricated in accordance with the present invention is described. FIG. 3A shows an unwound, film capacitor of the present invention. The capacitor includes two oblong dielectric films, each having a transverse direction (in the shorter dimension) and a longitudinal, or machine, direction (in the longer dimension). Dielectric films 210 and 212 include metallization layers 214 and 216, respectively, deposited thereon. Metallization layers 214 and 216 each has a heavy-edge along an outer edge of the dielectric film and segmentation in the transverse direction. Dielectric films 210 and 212 are arranged such that the two dielectric films have the heavy-edge structure on opposite longitudinal edge from each other. The arrangement of the heavy edge configuration is illustrated in detail in FIG. 3B, which shows a cross sectional view of unwound capacitor 200 of FIG. 3A. As can be seen in FIG. 3B, metallization layers 214 and 216 include heavy edges 220 and 222, respectively. Dielectric films 210 and 212 are arranged such that heavy edges 220 and 222 are on opposite longitudinal sides. The metallization layers are formed of a suitable material such as, for example but not limited to, aluminum-zinc alloy. The thinner, active regions of the metallization layers exhibit a resistivity of 1 up to but less than 8 ohms/square, and the heavy-edge regions are designed to exhibit a resistivity of 0.25 up to but less than 1.5 ohms/square. FIG. 3C shows a top view of dielectric film 210 with segmented, metallization layer 214 disposed thereon. As can be seen in FIG. 3C, the layout of metallization layer 214 is defined by a number of variables: a segment length 224, a segment separation 226 and a segment separation angle 228.

The capacitor of the present invention includes the following design concepts to improve the ability of the capacitor to handle pulse current:

I. Use Transverse Segmentation

As shown in FIG. 3A, the capacitor of the present invention uses a transverse segmentation. Although segmentation has been used previously in other capacitor designs to enhance voltage breakdown characteristics of the capacitor, Applicants have been unable to find references disclosing the advantages of the transverse segmentation design of the present invention in relation to the pulse current characteristic of a capacitor.

The transverse segmentation of the present invention is designed to prevent current flow in the longitudinal direction. For example, if the connection of the end spray metal and the metallization fails in any particular segment due to increased current density, the segment length and segment separation are designed such that the failure is isolated to that segment such that no spurious current flows in the longitudinal direction. The transverse segmentation is a significant improvement over prior art capacitors used with pulse current because it dramatically reduces the potential of end connection runaway failure if there is a bad connection at any location. In particular, the segmentation of the present invention isolates a failed end connection location, thus preventing runaway failure of the end connection. In other words, the highly advantageous segmentation scheme of the present invention prevents capacitor failure due to extreme pulse currents delivered to an external circuit. In and by itself, it is considered that this segmentation feature provides sweeping improvement over the prior art for optimized pulse current tolerance.

As discussed in the Background section, there are various patented and proprietary segmentation patterns available. However, Applicants have come to recognize that, for improvement in pulse current operation, only a highly advantageous transverse pattern is required. The segment length should be long enough to ensure that a connection may be made between each segment and the end spray metal. If the segment length is too long, there will be the tendency for the runaway failure to propagate within a segment, thus resulting in a larger than necessary capacitance loss due to a poor connection even in a single segment. For example, Applicants have found that segment lengths of approximately 10 to 25 millimeters are satisfactory.

The segment separation should be as small as technically possible in order to minimize the unavoidable capacitance loss caused by the segmentation. If a segment becomes disconnected, its voltage "floats." During pulse discharges, it is possible that the voltage between the floating segment and an adjacent connected segment would be sufficient to create a spark across the segmentation separation. This sparking effect is acceptable in the capacitor of the present invention as the metallization in the immediate area near the spark would be vaporized, thus increasing the segment separation at that point. Applicants have observed this effect in abuse tested capacitors around segments that have become disconnected. Typical segment separation in an actually fabricated capacitor is approximately 0.4 millimeters, and this separation is more than sufficient for pulse current operation.

The segment separation angle is not critical and may be varied from 90 degrees to even 60 degrees. The ideal separation angle would be 90 degrees since this angle would allow the most direct current flow path from a segment metallization to end spray metal, but it is submitted that the difference in performance between a separation angle of 90 degrees and a separation angle of 80 degrees would not be readily measurable.

A segment may become disconnected for a variety of reasons such as, for example, humidity corrosion, missing connection with end spray metal (a manufacturing process related defect), mechanical damage or extremely high pulse current. However, in the capacitor of the present invention, the only significant effect of segment disconnection is the loss of the capacitance contributed by that segment. Since the failed segment is isolated from the rest of the capacitor, the remaining segments continue to function as good capacitors, and the sum of the segment capacitances and their quality contribute to the overall capacitance value and electrical quality.

When capacitors are operated at high enough AC or pulse voltage changes, there will be partial discharges (or corona) at the points of highest electrical stress, namely the metallization edges. In prior art capacitors of traditional design, these partial discharges occur in the longitudinal direction along the metallization edge opposite the edge which is in direct contact with the end spray metal. Each partial discharge results in minute but cumulative, irreversible damage to the underlying dielectric film, eventually causing the dielectric to fail. At the point of dielectric failure, the resulting arc, through the defect, evaporates enough metal to isolate the fault. After a long enough run time, there become so many dielectric failures along the metallization edge that most of the metal along the edge opposite the end spray edge is vaporized. Subsequently, the capacitor losses increase and, in pulse applications, there will come a point where the current density through the capacitor causes the remaining metal to evaporate. Quick failure of the entire capacitor results as these areas and adjacent connections with the end spray metal are vaporized.

It is generally acknowledged that any capacitor operated for a long enough time in corona will ultimately fail. The vaporization of the metal at a corona related dielectric failure does not stop the corona, it just moves the location of the corona to the edges of the remaining metal. Eventually, most of the metal will be gone, or what remains will have no path to the connection of the end spray metal to the metallization. Applicants submit that a film capacitor with very thin metallization, such as that disclosed by Unami, will fail more rapidly than a capacitor with thicker metallization. Furthermore, there is also some evidence that the partial discharges oxidize the metal at the edges involved, removing metal before dielectric failure takes place. In testing of actual film capacitors, Applicants have noted locations where some metal appears to have been removed along the transverse segmentation edges without a dielectric failure. It is submitted that very light metallization would be much more quickly oxidized, thus leading to faster capacitance reduction and capacitor failure.

Remarkably, when capacitors with transverse segmentation in accordance with the present invention are operated in corona, Applicants have discovered that a majority of dielectric failure sites form along the transverse edge segments.

This empirically demonstrated behavior was entirely unexpected and is considered to be highly advantageous. In particular, the vaporization of the metal along the transverse segment edges result in capacitance losses due to the missing metal, but the current path from each segment to the end spray metal is preserved. As a result, it is submitted that the pulse discharge tolerance of the capacitor of the present invention is substantially increased over the prior art in the case where the pulse voltage is high enough to cause corona upon discharge.

Figure 4A:
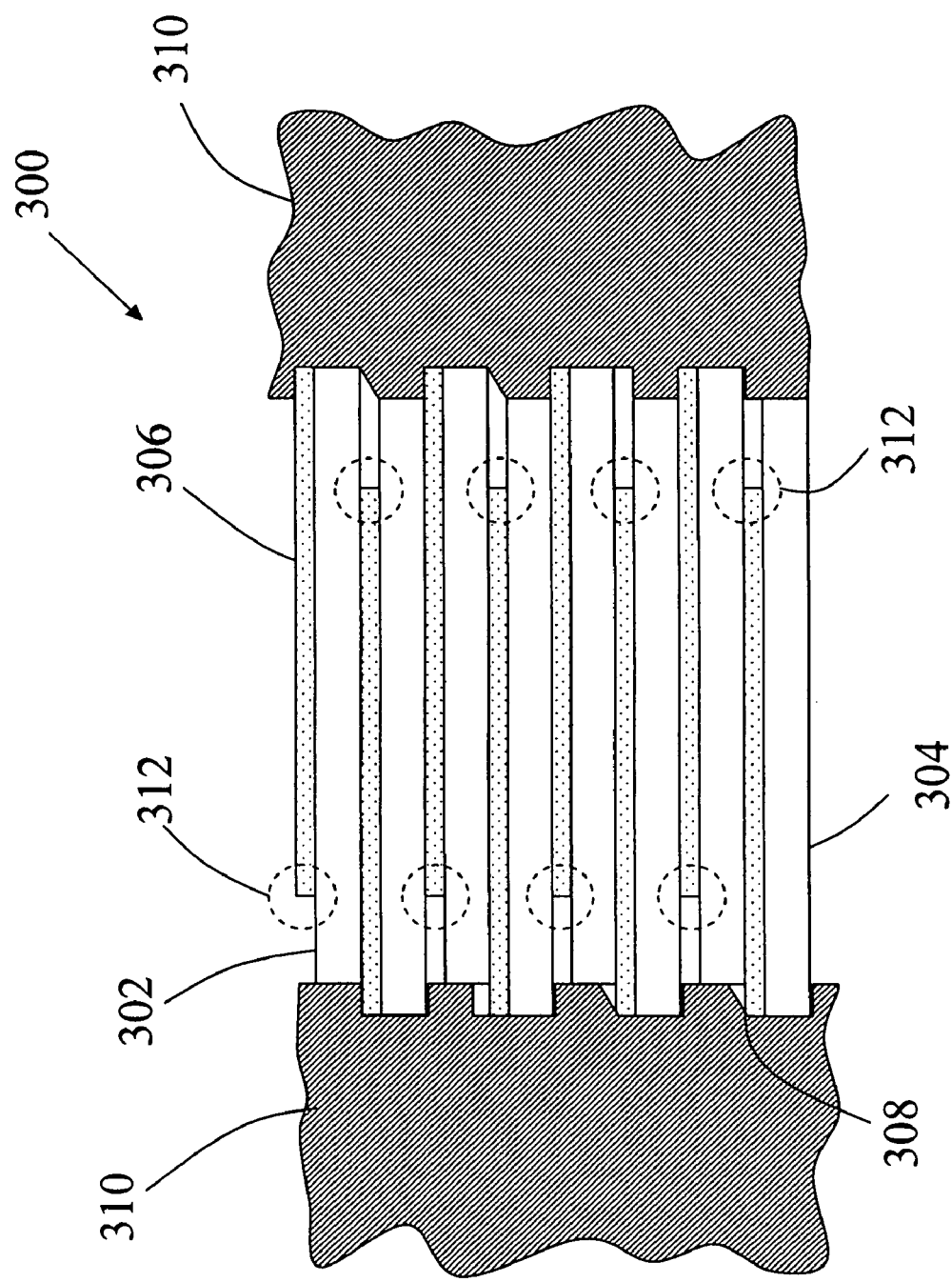
FIGS. 4A–4C are a series of diagrammatic illustrations showing the effects of metallization segmentation on potential corona damage to a conventional film capacitor. Additionally.
Figure 4B:
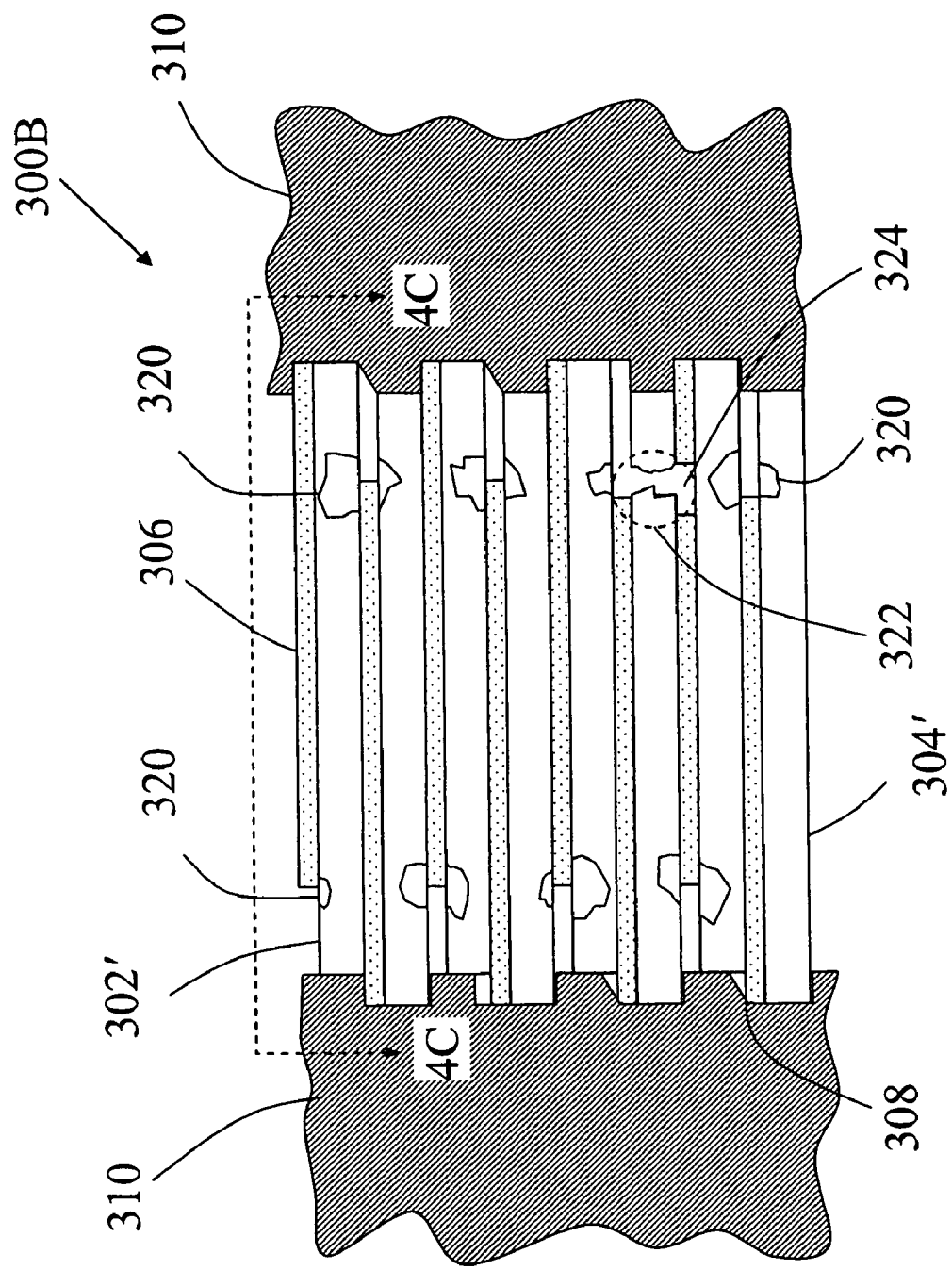
Figure 4C:
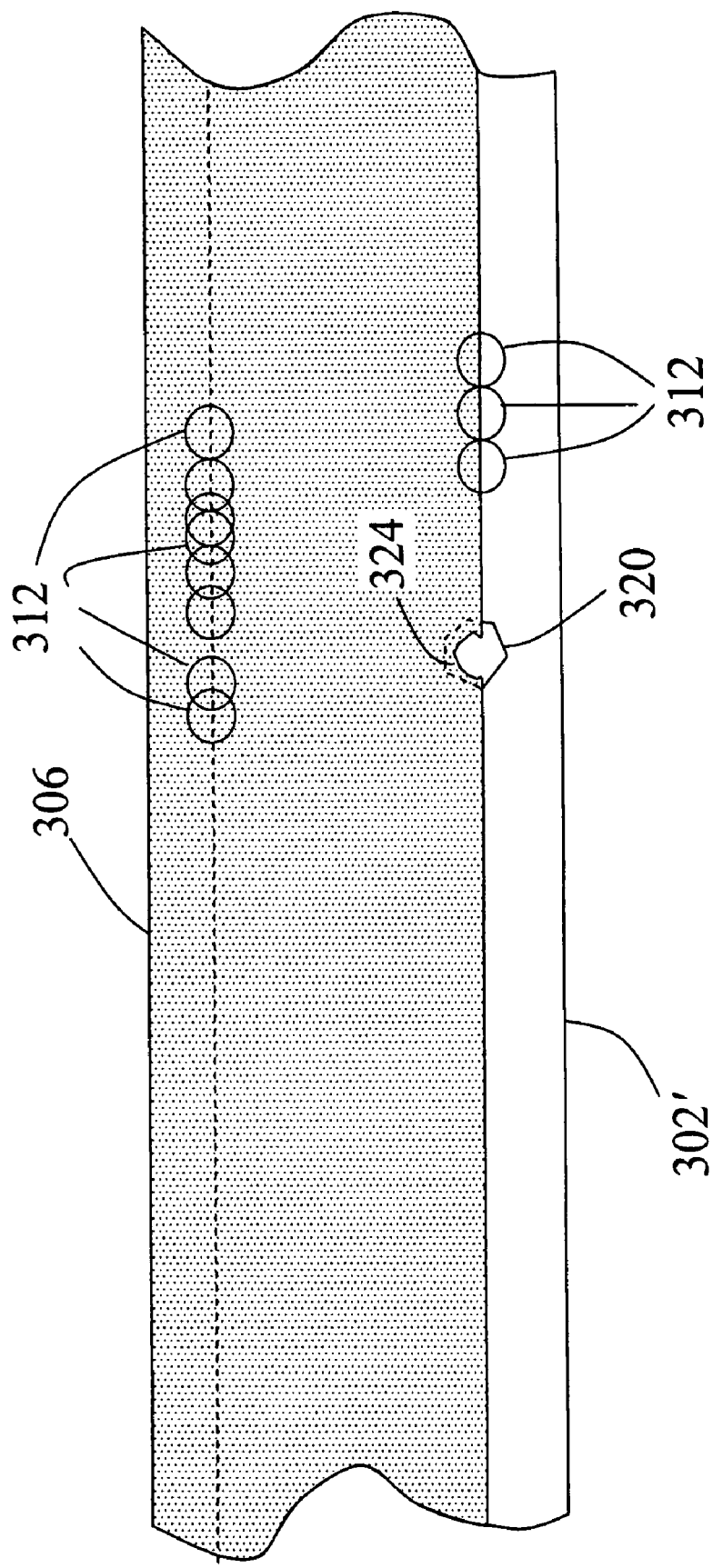

FIGS. 4A–4C illustrate the effects of operating a conventional capacitor in corona. FIG. 4A shows a partial cross section of a wound film capacitor 300, including dielectric films 302 and 304 with metallization layers 306 and 308 respectively. Shaded areas 310 represent end spray metal. Dashed circles 312 indicate locations within conventional capacitor 300 where high electric fields tend to cause corona upon application of a high peak-to-peak voltage to the capacitor. The resulting corona damage is shown in FIG. 4B. As can be seen in FIG. 4B, dielectric films 302' and 304' now exhibit a plurality of trenches 320 due to the gradual eroding of the dielectric film during capacitor operation in corona. Eventually, the erosion may become so severe that a clearing (as indicated within a dashed circle 322) of the dielectric film as well as a hole 324 in the metallization layers surrounding the corona damage may result. A top view of this corona damage result is shown in FIG. 4C, which illustrates the presence of a plurality of corona damage locations 312 including trench 320 in dielectric film 302' and hole 324 in metallization layer 306. Such clearings, if large in number, may cut the metallization layer along a substantial length, thus blocking current flow. Consequently, the current density increases at the sites not damaged by corona, thereby potentially leading to the runaway failure problem earlier described in reference to FIGS. 1A–1D.

Figure 4D:
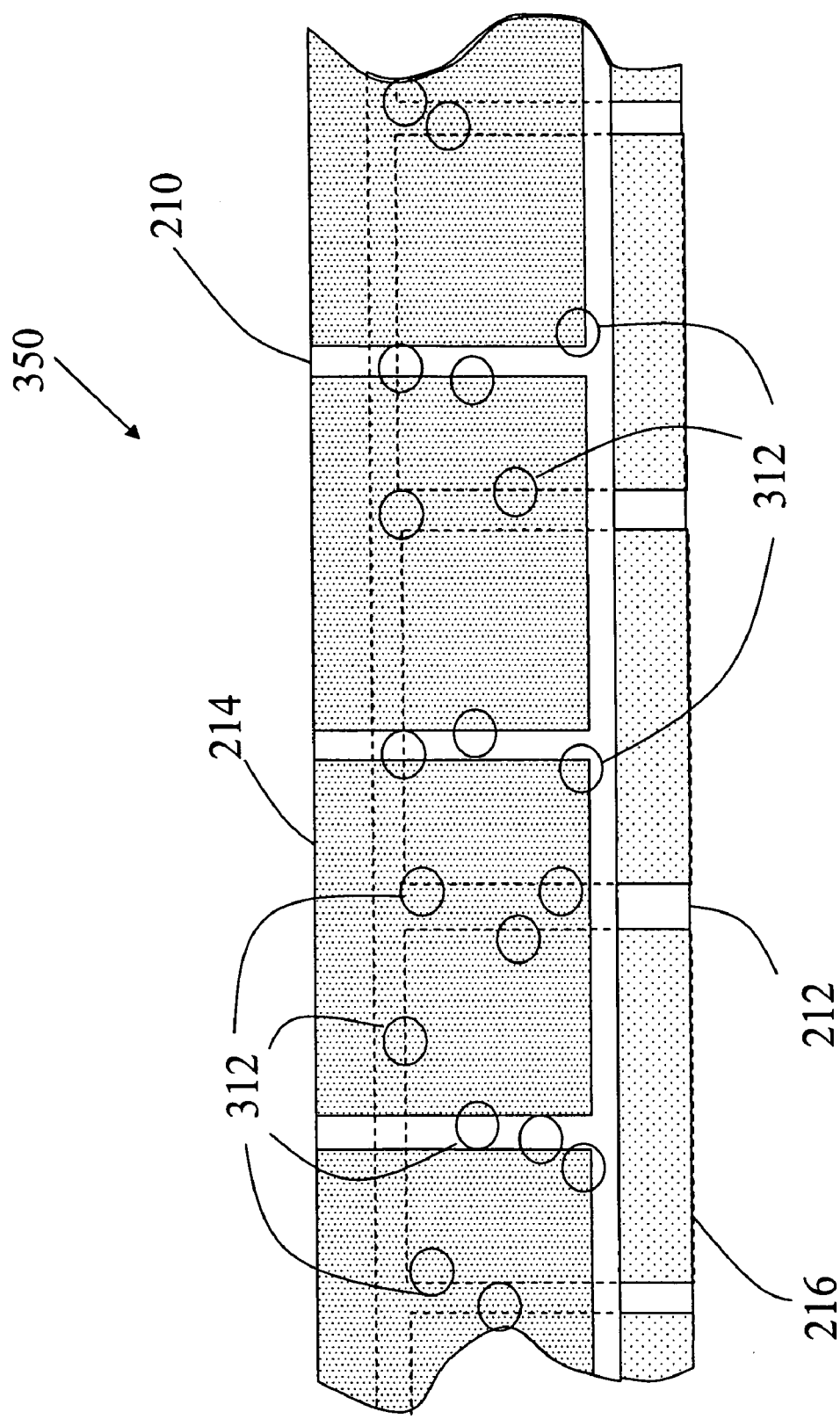
FIG. 4D is a diagrammatic illustration showing the advantages of the segmentation configuration of the present invention in relation to potential corona damage.

In contrast, FIG. 4D illustrates the result of corona damage in a capacitor 350 of the present invention including transverse segmentation. Referring to FIG. 4D in conjunction with FIG. 3A, dielectric films 210 and 212 with segmentation layers 214 and 216, respectively, operated in corona may result in a plurality of damage locations 312. However, due to the segmentation configuration of the present invention, the corona damage locations of the overlapping dielectric films are staggered such that complete clearings of metallization layers as well as the dielectric films are less likely to occur. Applicants have found that segmented film capacitors operated in corona exhibit the most dielectric damage along transverse segmentation separations rather than along the longitudinal edges. While the metal loss from clearing results in a decrease in capacitance, the remaining capacitance is of good quality and remains suitable for pulse applications.

The aforedescribed oxidization effect may be a significant problem with the multiple segments used in Unami as shown in FIG. 4 of Unami. Since the partial discharge intensity is proportional to peak to peak voltage, if there is a clearing in one of the floating segments for any reason, then the capacitance balance will be upset such that each of the series capacitors no longer supports the same voltage. That is, segments with reduced capacitance will see more voltage, thus resulting in increased rate of corona damage. This increase in the rate of corona damage in and of itself is a runaway failure mode that Applicants have observed in conventional capacitors. In this case, segmentation does tend to localize these runaway effects, rather than destroy the entire capacitor as it will for the case without segmentation.

Since the rate of corona damage in film capacitors with thicker metallization is slower, it is submitted that the heavier metallization in the active area of the capacitor of the present invention helps to increase capacitor reliability when operated in corona as compared to capacitors with thinner metallization, such as that described by Unami.

II. Use the Heaviest Edge Metallization Reasonably Obtainable

As discussed above in the Background section, Unami discloses that the active region of the metallization in the film capacitor should exhibit a resistivity in the range of 8 to 30 ohms/square while the heavy-edge should exhibit a resistivity of 1 to 8 ohms/square. However, Applicants have found that improvement in pulse current capability may be obtained by using an active region with 1 up to but less than 8 ohms/square resistivity and a heavy-edge with 0.25 up to but less than 1.5 ohm/square resistivity. Such resistivity values may readily be obtained using an active region and heavy-edge formed of a single alloy (such as, for example but not limited to, an aluminum-zinc alloy) rather than having to resort to the formation of the active region with a single material (such as aluminum) to achieve a very thin active region and additionally depositing a separate heavy-edge of another material (such as pure zinc) in order to achieve the desired thickness ratio between the active region and the heavy-edge. With the metallization techniques presently available, there is a limit to the ratio of metal thickness that can be laid down in the active area to the amount that can be laid down at the heavy-edge for a single pass of metallization. Furthermore, even a double pass of metallization with aluminum does not provide sufficient decrease in current density at the edge. However, although the prior art teaches directly and explicitly against the use of thicker metallization especially in the active region, Applicants have found that the pulse current capability improvement obtained by this technique far outweighs any dielectric withstand penalty of the thicker active region metallization. (Applicants recognize that this configuration provides a limited decrease in current density). Applicants further recognize that there are additional disadvantages in using aluminum to form the heavy edge. Zinc has a lower heat of vaporization than aluminum, so, for a given metal thickness, aluminum can cause the film to curl due to heat damage. In practice, the dielectric strength obtained even with the thicker metallization is more than satisfactory for the intended applications for which the capacitor of the present invention has been developed.

The improved pulse current capability of the capacitor of the present invention is obtained with very small size capacitors comparable to traditional designs. The extremely heavy-edge of the capacitor of the present invention reduces electrical losses in the capacitor with the application of pulsed current. However, the primary reason for the extremely heavy-edge is to sufficiently build out the thickness of the edge of the metallization such that the current density at the connection points with the end spray metal is reduced. It is emphasized that the capacitor of the present invention achieves the improved pulse current capability using an active region and heavy-edge formed using a single alloy. A separate zinc metallization edge strip, such as disclosed in Unami, is not required in the capacitor of the present invention, which is designed specifically for high pulse current duty, because there is no specific requirement for an extreme heavy-edge to active area metal thickness ratio.

Other Implementations

Figure 5A:
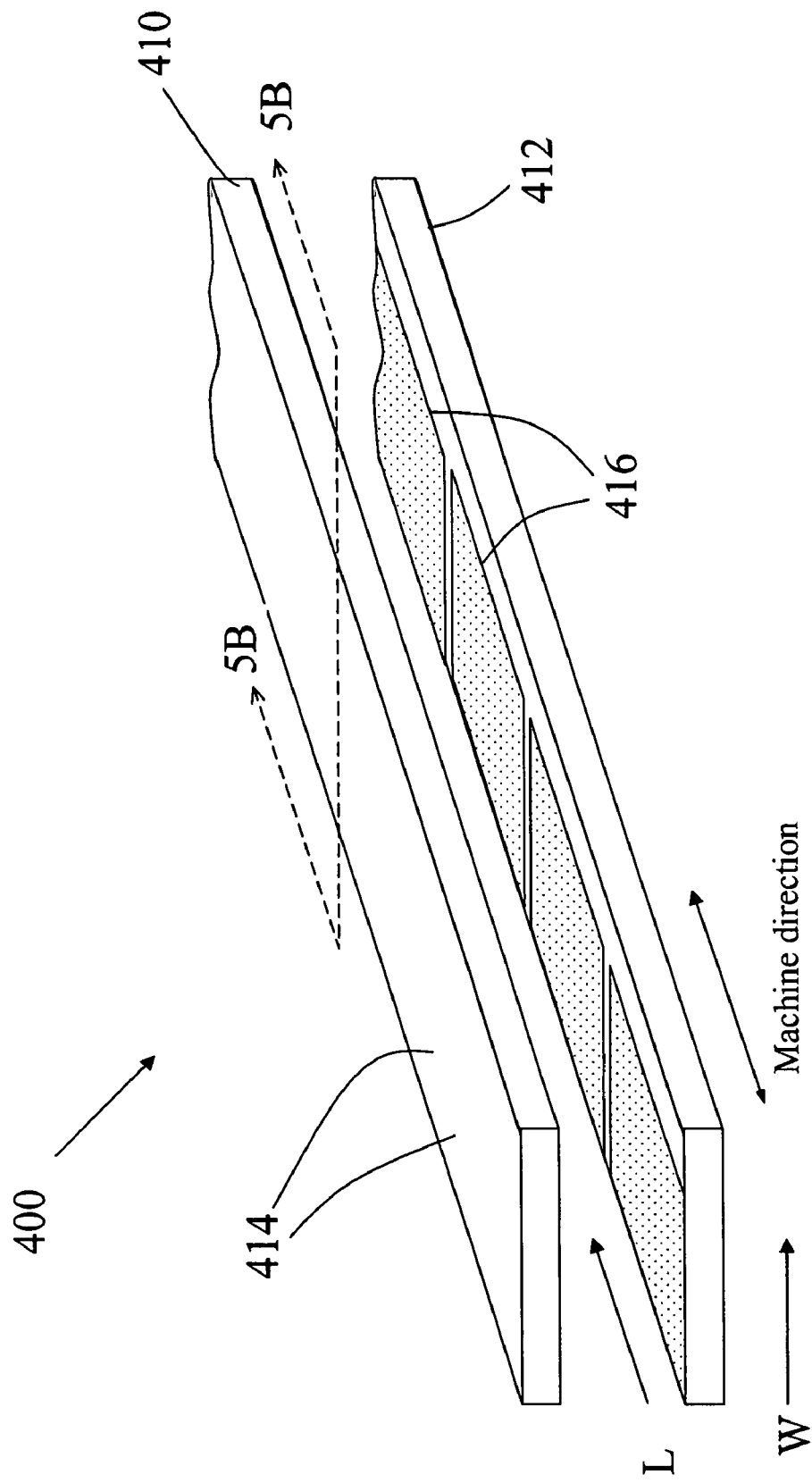
FIG. 5A is a diagrammatic illustration, in perspective view, of another embodiment of a capacitor of the present invention
Figure 5B:
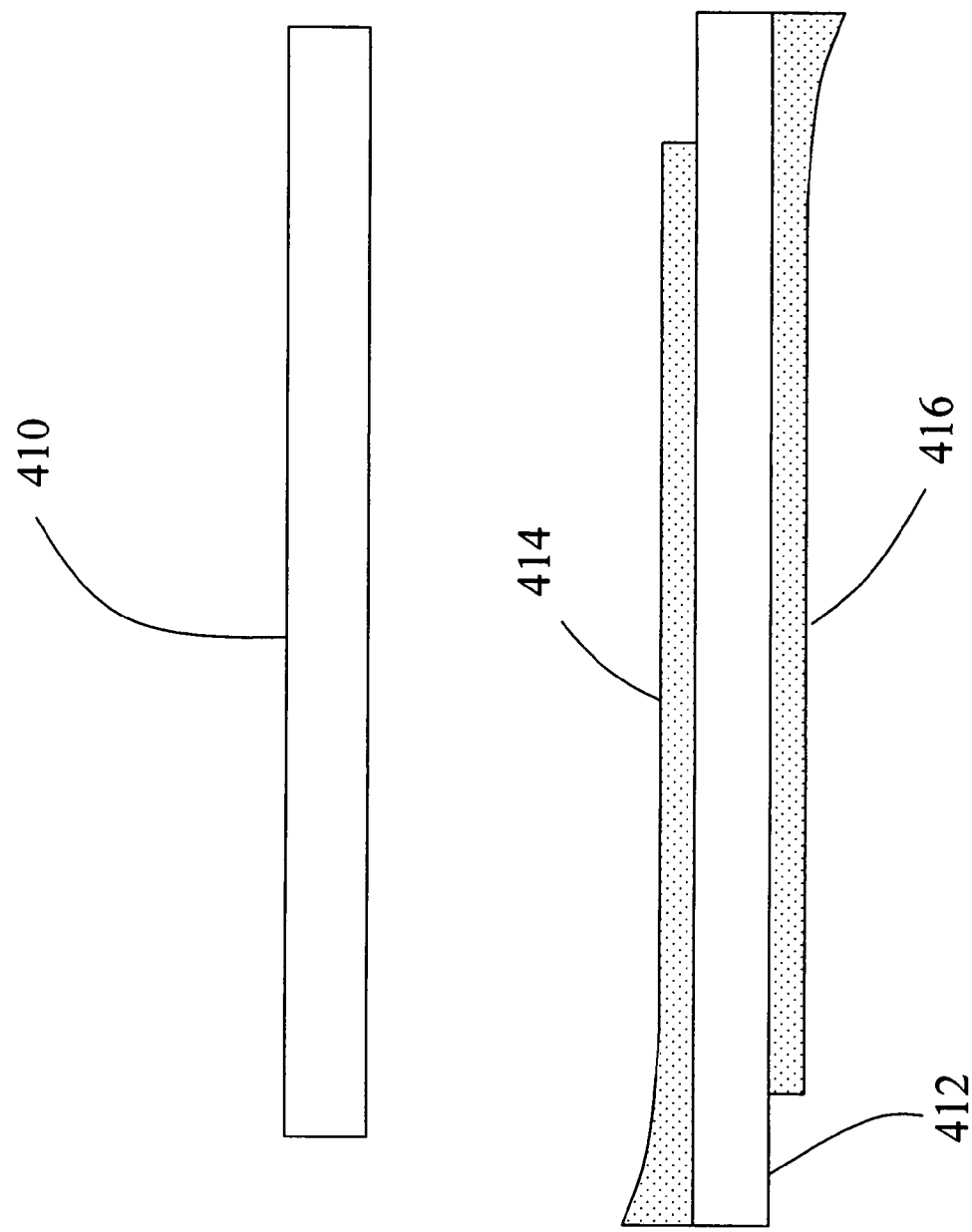
FIG. 5B is a diagrammatic illustration of a cross-sectional view of the unwound capacitor of FIG. 5A, shown here to illustrate the details of the heavy edge configuration.

Another embodiment of the capacitor of the present invention is shown in FIGS. 5A and 5B. A capacitor 400 shown in FIGS. 5A and 5B is similar to that shown in FIGS. 3A–3C, but both metallization layers are deposited on opposite faces of only one of the dielectric films while the other dielectric film has no metallization. This feature is particularly visible in FIG. 5B, which shows a cross sectional view of unwound capacitor 400 of FIG. 5A.

Figure 6A:
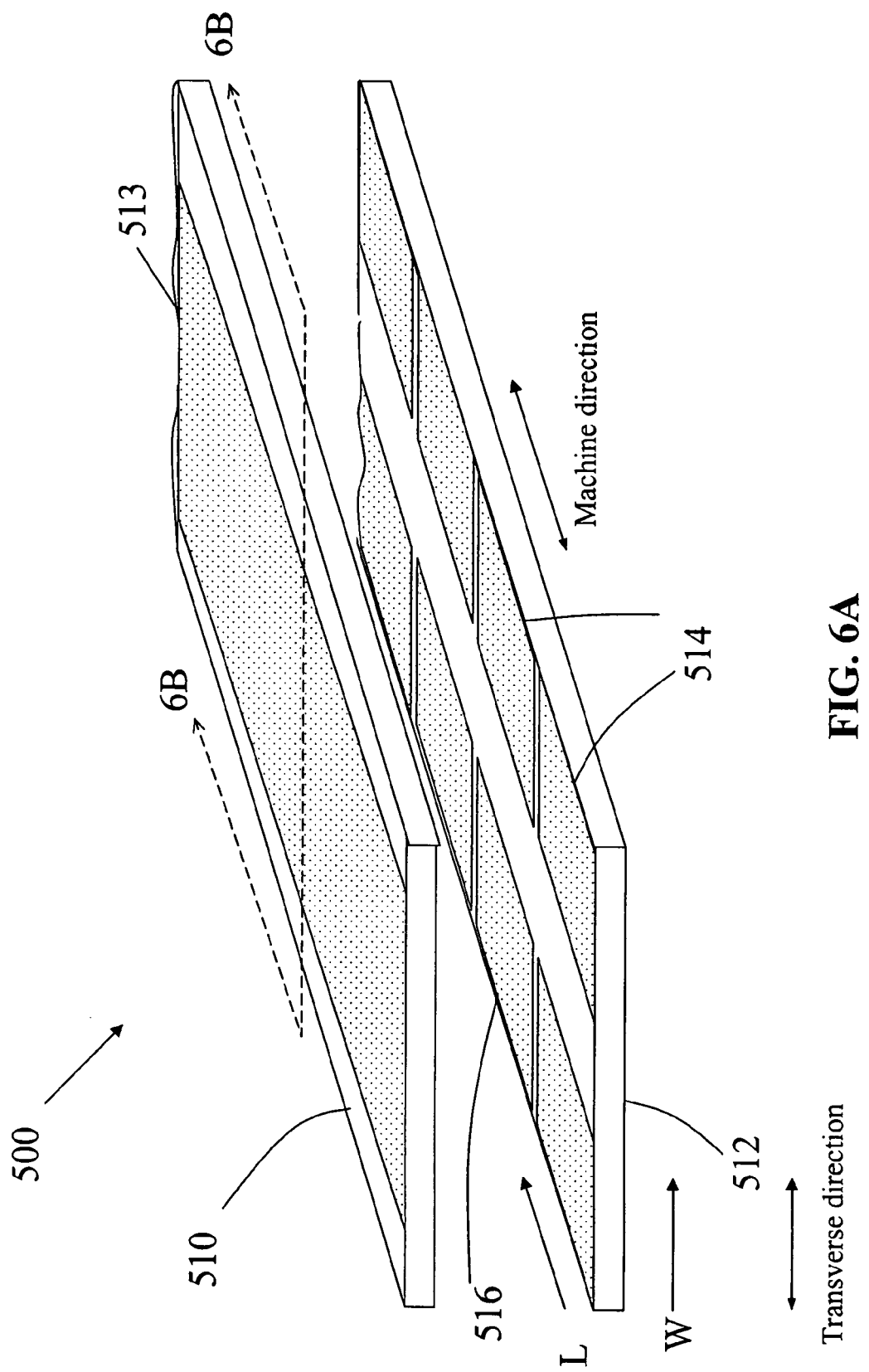
FIG. 6A is a diagrammatic illustration, in perspective view, of yet another capacitor of the present invention.
Figure 6B:
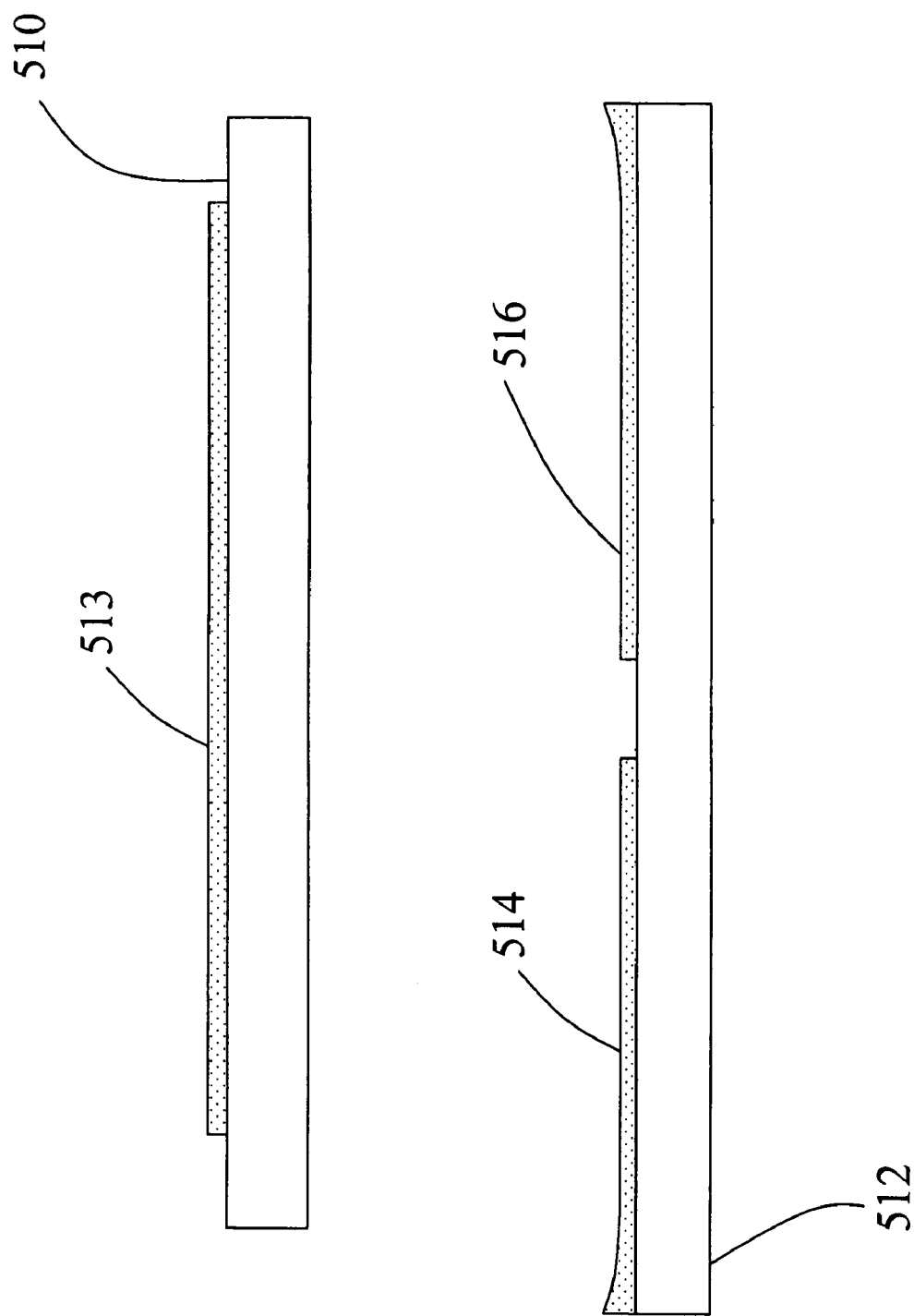
FIG. 6B is a diagrammatic illustration of a cross-sectional view of the unwound capacitor of FIG. 6A, shown here to illustrate the details of the heavy edge plus common metal configuration.

Still another embodiment is shown in FIGS. 6A and 6B, which is a variation of the capacitor configuration shown in FIGS. 3A–3C. A capacitor 500 of FIG. 6A includes the two segmented metallization layers formed on a single dielectric film while the other dielectric film includes a continuous, common metal deposited thereon. This configuration connects two capacitors in series internally such that the DC voltage capability and the peak-to-peak voltage capability (i.e., the amount of voltage the capacitor can withstand without partial discharges) of the capacitor are increased. The configuration may include even or odd numbers of capacitors in series. The number of capacitors that can be connected in series is limited by the maximum width of dielectric film that can be wound and the fact that, as the number of series capacitors increases, the insulation spaces take up more and more of the internal volume.

Figure 7A:
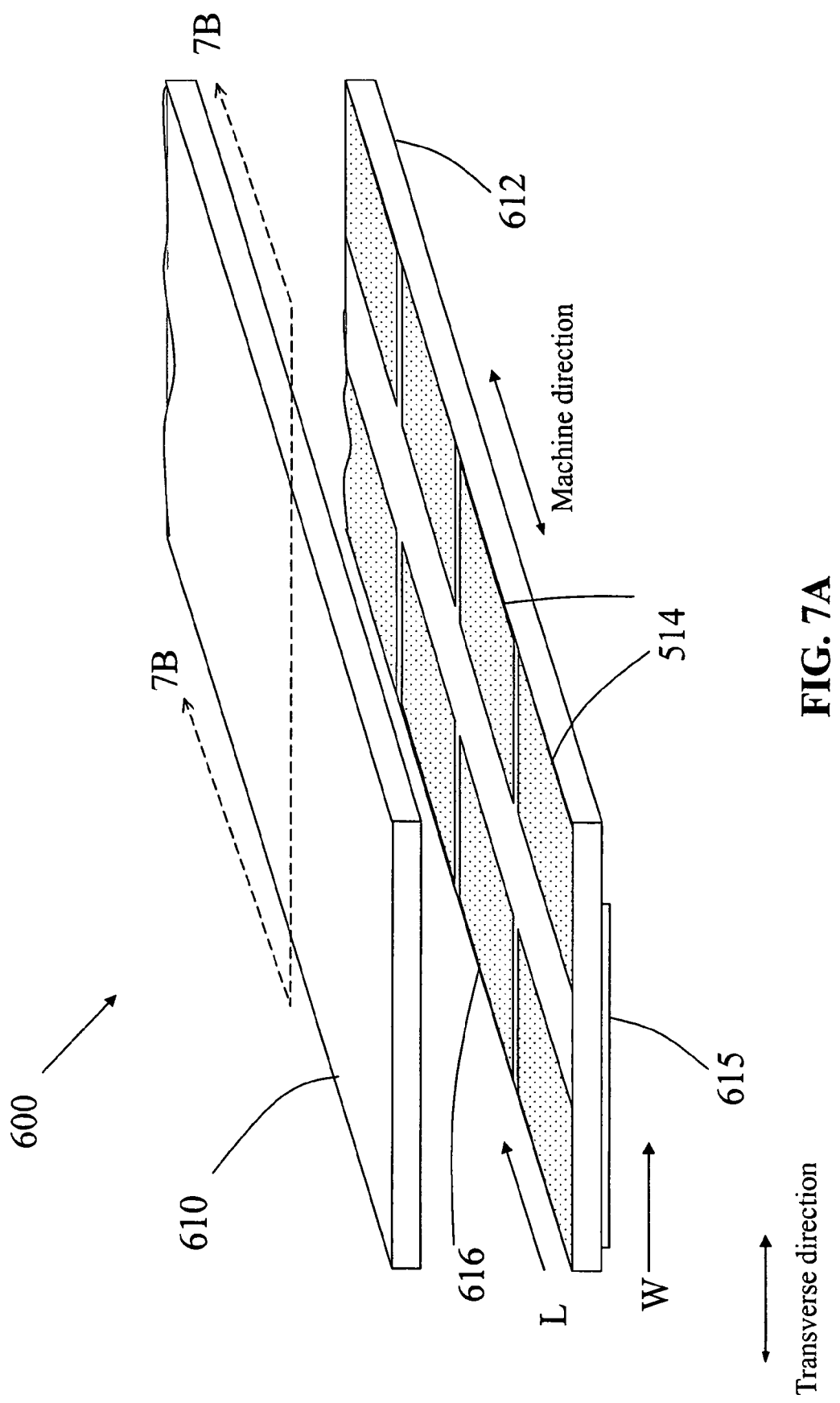
FIG. 7A is a diagrammatic illustration, in perspective view, of still another embodiment of a capacitor of the present invention.
Figure 7B:
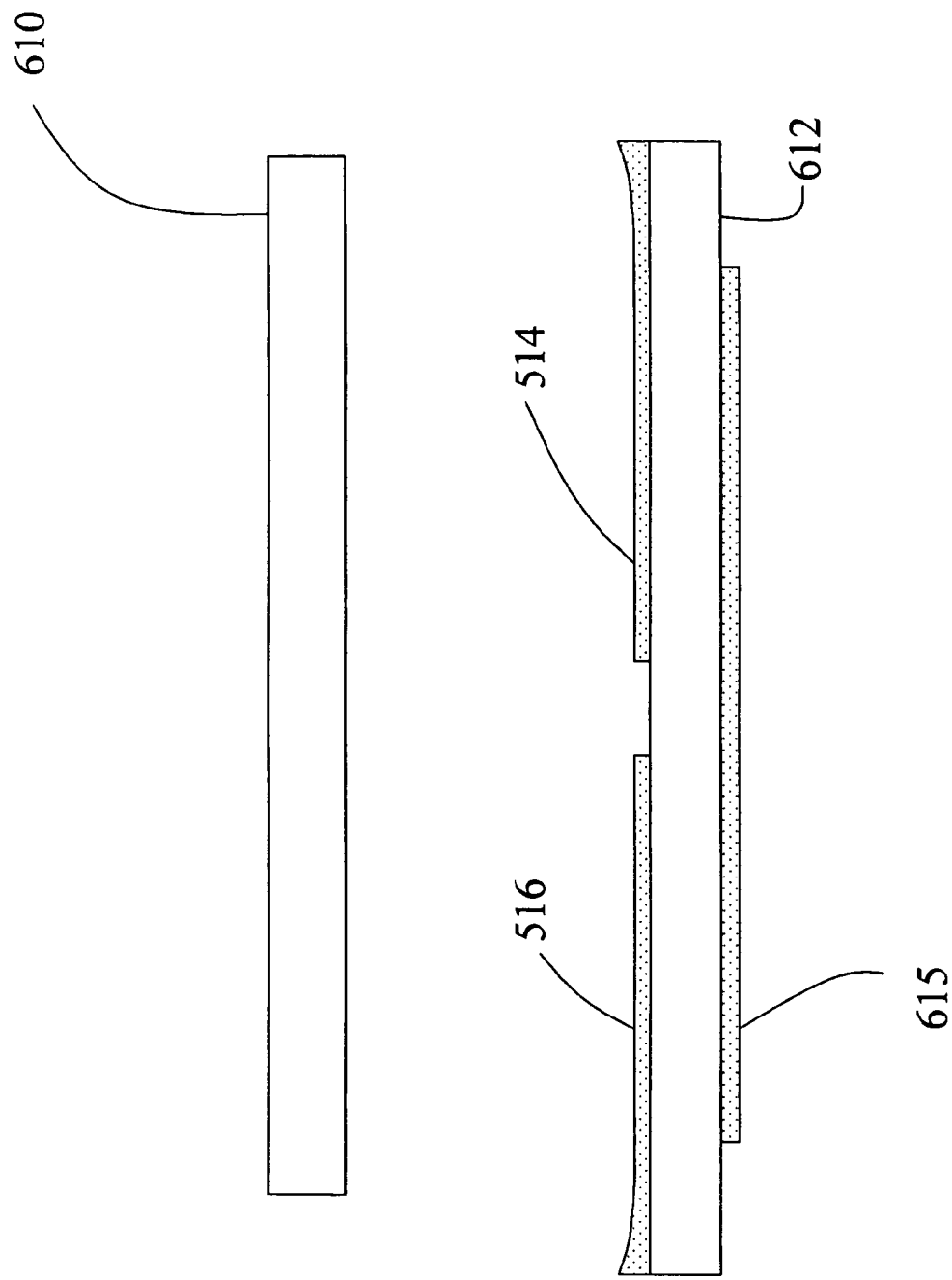
FIG. 7B is a diagrammatic enlarged cutaway view, in cross section, taken along a line 7B—7B, as shown in FIG. 7A, of the unwound capacitor of FIG. 7A, shown here to illustrate the details of the combination of the plain dielectric film and the double metallized film.

As still another embodiment, FIGS. 7A and 7B illustrates a capacitor in which all of the metallization layers, including the segmented layers and the common metal, are formed on opposing faces of a single dielectric film.

In the case wherein an even number of internal capacitors are used, one of the dielectric films may be uniformly metallized with thinner metallization (e.g., ~2 to less than ~8 ohms/square) in order to improve voltage withstand, although the resulting capacitor might not be optimized for voltage withstand. The aforedescribed design principles are applicable to all film types.

Test Data Summary

A number of capacitors have been fabricated by Applicants in accordance with the present invention and tested for comparison purposes against prior art capacitors. The pulse capability for metallized capacitors is considered in terms of the current that can be delivered per unit of active film length with acceptable pulse operation performance (amperes/inch).

Typical Pulse Current Capability for Flat Aluminum Metallization (Prior Art):

|  | Polyester film | Polypropylene film |
| --- | --- | --- |
| 2–4 ohms/square | 0.5 Amperes/inch | 0.25 Amperes/inch |
| 1–2 ohms/square | 1 Amperes/inch | 0.5 Amperes/inch |

Typical Pulse Current Capability for Zinc Alloy Heavy-Edge (Prior Art)

|  | Polyester film | Polypropylene film |
| --- | --- | --- |
| ~1.5 ohms/square | ~4 Amperes/inch | ~2 Amperes/inch |

For all of the above cases, the actual results are extremely sensitive to manufacturing process variations. It is important to understand that it is the poorest electrical connection in the capacitor that can cause it to fail catastrophically as previously described.

For an exemplary capacitor including segmented zinc alloy heavy-edge configuration of the present invention on an 8 micron polyester film, tests have been run as high as 15 amperes/inch of film that is in contact with the end spray metal. Specifically, the capacitor, fabricated in accordance with the present invention, was operated at 188 V/micron using a "bare" capacitor section (i.e., the metallized films are wound together and sprayed with end metal but the resulting capacitor is not encapsulated) with the shortest possible wire loop for the short circuit to minimize the inductance and resistance, which tend to slow down the discharge, and to allow access to the end-spray metal to attach the oscilloscope leads to remove the potential for errors that may result if the measurement was made with the oscilloscope connected to the same wire used for the discharge. The encapsulation was eliminated in order to allow the shortest leads to be used for the test discharges. Current was extracted from the dV/dt data observed using an oscilloscope. The scope connections to the capacitor end spray metal were separate from the connections used to create the short circuit capacitor discharge (four wire measurement). Multiple short circuits at this current level (greater than 10 amperes/inch, less than 100 amperes/inch) resulted in only a 5% capacitance loss, and the remaining capacitance was found to be of very good quality during pulse discharge. These results, in and by themselves, are considered as remarkable and as representative of a new standard of pulse discharge tolerance for metallized film capacitors.

It is submitted that the combination of the highly advantageous transverse segmentation and heavy-edge configuration, using a single alloy for the active region and the heavy-edge, unexpectedly result in improved pulse current capability over the capacitors of the prior art. In so far as Applicants are aware, segmentation of the metallization has not been previously utilized to optimize capacitors for extreme pulse applications. Also, although others have used a heavy-edge configuration with a high thickness ratio between the heavy-edge and the active region metallization, there is a ratio limit that can be achieved using only a single material such as, for example, a zinc alloy. If extremely thin metallization is required in the active region of the capacitor, the heavy-edge cannot be made thick enough for extreme (or even moderate) pulse current withstand using an alloy alone. However, Applicants have found that the capacitor of the present invention achieves improved pulse current capability with edge resistivity values at or substantially below the levels recommended by the prior art such as Unami. It is submitted that optimization for reliable, extreme pulse current capability does not require concurrent optimization of voltage withstand. Applicants consider the pulse current optimization by the use of extreme heavy-edge and relatively thick metal in the active area is entirely acceptable.

Although each of the aforedescribed embodiments have been illustrated with various components having particular respective orientations, it should be understood that the present invention may take on a variety of specific configurations with the various components being located in a wide variety of positions and mutual orientations and still remain within the spirit and scope of the present invention. Furthermore, suitable equivalents may be used in place of or in addition to the various components, the function and use of such substitute or additional components being held to be familiar to those skilled in the art and are therefore regarded as falling within the scope of the present invention. Therefore, the present examples are to be considered as illustrative and not restrictive, and the invention is not to be limited to the details given herein, but may be modified within the scope of the appended claims.

What is claimed is:

1. In a method for using a capacitor, said capacitor including first and second dielectric elongated layers with first and second metallization arrangements, respectively, supported by said layers, each one of said first and second dielectric layers having a pair of opposing edges running generally parallel in an elongated direction, each of the first and second metallization arrangements including an active region and a lengthwise, heavy-edge region in electrical communication with the active region arranged generally along one of the opposing edges of one of the dielectric layers such that a boundary, formed between the active region and the heavy edge region of each metallization arrangement, can be subject to runaway disconnection of the heavy edge region from the active region, along said boundary, responsive at least to using said capacitor to externally deliver one or more current pulses through a pair of external electrical connections, said first and second dielectric layers being wound together into a roll to form a main body of said capacitor, the heavy edge region of each of said first and second metallization arrangements being configured to form said pair of external electrical connections at opposing ends of said roll, said method comprising:

segmenting at least a selected one of said first and second metallization arrangements to form a plurality of current-isolated segments that are arranged along said elongated direction in a way which confines an initial disconnection formed within said boundary of a particular one of the segments to that particular segment responsive to said one or more current pulses such that only the particular segment is subject to runaway.

2. The method of claim 1 wherein said segmenting step includes the step of defining a plurality of gaps spaced apart along said longitudinal direction and transverse thereto such that said selected one of said first and second metallization layers is divided into a plurality of segments arranged along said longitudinal direction.

3. In a method for using a capacitor, said capacitor including first and second dielectric elongated layers with first and second metallization arrangements, respectively, supported by at least one of said layers, each one of said first and second dielectric layers having a pair of opposing first and second dielectric edges running generally parallel in an elongated direction, each of the first and second metallization arrangements including an active region defining a first lengthwise edge thereof and a heavy-edge region in electrical communication with the active region and defining a second lengthwise edge thereof such that a corona discharge occurs along the second lengthwise edge responsive to a given current, said first and second dielectric layers being wound together into a roll to form a main body of said capacitor so that the heavy-edge regions of said fast and second metallization arrangements form a pair of external electrical connections at opposing ends of said roll, said method comprising:

configuring said first and second metallization layers in a way which moves said corona discharge away from the second lengthwise edge thereof.

4. The method of claim 3 wherein the configuring step includes the step of defining at least one gap in at least one of said metallization arrangements which gap is least generally transverse to said elongated direction such that said corona discharge occurs to an edge of the metallization arrangement that serves, in part, to define the gap.

5. The method of claim 4 including forming a plurality of said gaps, spaced apart along said elongated direction.

6. The method of claim 4 wherein said gap extends completely one of said metallization arrangements in a way which creates a current-isolated segment on either side of the gap in the elongated direction.

* * * * *